United States Patent Office.

JOSEPH VAN RUYMBEKE, OF CHICAGO, ILLINOIS, ASSIGNOR TO THE NATIONAL CHEMICAL AND FERTILIZER COMPANY, OF SAME PLACE.

NITROGENOUS FERTILIZER.

SPECIFICATION forming part of Letters Patent No. 448,387, dated March 17, 1891.

Application filed May 16, 1890. Serial No. 352,075. (No specimens.)

*To all whom it may concern:*

Be it known that I, JOSEPH VAN RUYMBEKE, a subject of the King of Belgium, residing at Chicago, in the county of Cook and State of Illinois, have invented certain new and useful Improvements in Fertilizing Material, which are fully set forth in the following specification.

My invention relates to a fertilizer obtained from the waste product of rendering establishments, generally known as "tank-water," and which in a partially concentrated form is also well known as "stick." This substance stick is obtained by evaporating tank-water freed from the "tankage," and while still hot, to about 22° to 30° Baumé, the result being a stiff viscous liquid, which, however, may be kept almost indefinitely without decomposition and consquent loss of nitrogen.

My present invention consists in a mixture with this liquid stick of certain animal matter which when properly dried forms a fertilizing material of practically permanent form.

It is well known that stick is a deliquescent substance, and great difficulty has been met in forming compounds or mixtures with this substance for fertilizing purposes which would retain their form and condition under climatic exposure, this being absolutely necessary in a merchantable product. I have discovered that if certain animal substances be mixed with liquid stick in certain proportions and dried within certain limitations of heat the result is a dry or brittle substance, which may be ground or pulverized, and will retain its dry condition sufficiently well to make it a merchantable product, and which is adapted for use as an ammoniate fertilizer.

The animal matter which I use as the ingredient with liquid stick to make this product is dried blood, dried tankage, hoofmeal, horn-piths, or glue wastes. Either one of these substances will form a satisfactory product with the stick.

The mixture should be in proportions about as follows: To two thousand pounds of liquid stick at about thirty per cent. moisture, add eight hundred pounds of finely-ground dried tankage, or six hundred pounds of finely-ground dried blood, or six hundred pounds of finely-ground hoofmeal, or six hundred pounds of finely-ground horn-piths, or six hundred pounds of finely-ground dried glue wastes.

Whichever ingredient is to be used with the stick is applied to the latter in a suitable mixing-receptacle, where the two materials are thoroughly and completely mixed together by any suitable means. The admixture of the two ingredients must be complete. This mixture is then dried in suitable pans at such a degree of heat as may be expedient for this purpose, provided, however, that it must in no case be raised above 380° Fahrenheit, beyond which free ammonia will be driven off and liquefaction produced. The dried product is hard and brittle and is ground or otherwise pulverized to prepare it for the market. This product will retain its dry pulverized condition sufficiently well for all practical purposes, so that a merchantable article is obtained for fertilizing purposes.

I do not wish to be understood as limiting my invention to the exact proportions in pounds as stated above, for slight variations may be made, and in case the stick contains more or less than thirty per cent. moisture the proportions must be correspondingly varied. In some instances it may be found desirable to use liquid blood instead of dried material, in which case two thousand four hundred pounds of liquid blood should be used as the equivalent of six hundred pounds dried blood.

Having thus described my invention, what I claim as new, and desire to secure by Letters Patent, is—

A fertilizing material composed of liquid stick and ground dried animal matter in the proportions of about two thousand pounds of the former and six hundred to eight hundred pounds of the latter, thoroughly mixed and subjected to a heat not exceeding 380° Fahrenheit, whereby a dry, pulverulent, and practically non-deliquescent meterial is obtained, substantially as and for the purposes specified.

JOSEPH VAN RUYMBEKE.

Witnesses:
CARRIE FEIGEL,
A. M. BEST.